(No Model.)
H. FISHER.
COMBINATION TOOL.
No. 254,631. Patented Mar. 7, 1882.
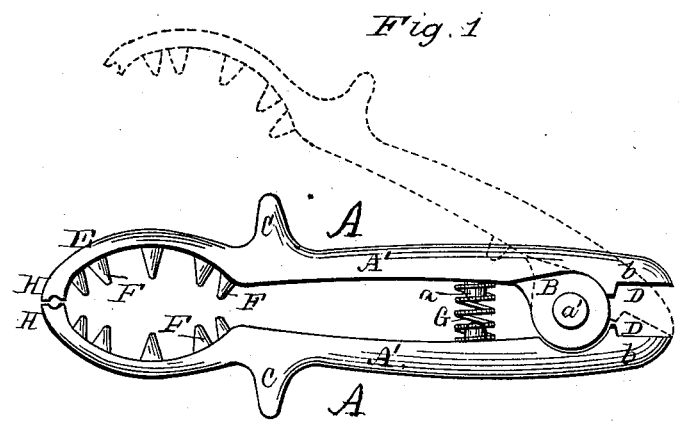
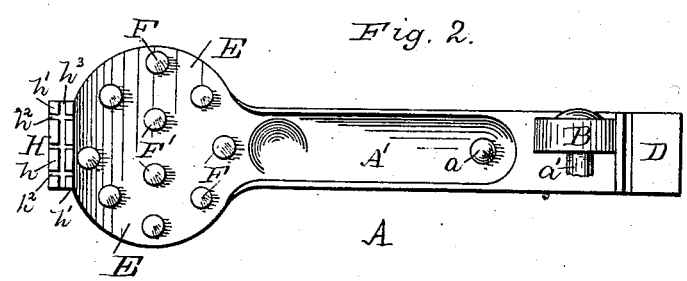
Witnesses:
W. B. Massow.
J. S. Barker.
Inventor:
Henry Fisher
by Doubleday and Bliss
Attys.

UNITED STATES PATENT OFFICE.

HENRY FISHER, OF CANTON, OHIO.

COMBINATION-TOOL.

SPECIFICATION forming part of Letters Patent No. 254,631, dated March 7, 1882.

Application filed May 3, 1881. Renewed January 30, 1882. (No model.)

*To all whom it may concern:*

Be it known that I, HENRY FISHER, a citizen of the United States, residing at Canton, in the county of Stark and State of Ohio, have invented certain new and useful Improvements in Combination-Tools; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a side view of my improved implement. Fig. 2 is an inside view of one of the arms detached.

The arms are exactly alike in shape, and are represented in the drawings by A A. The similarity of their shape allows of their being cast in the same mold, and reduces the labor and expense of construction much below what is necessitated if they were in any way dissimilar in shape. Each arm is formed with a shank portion, A', an inwardly-projecting ear, B, an inwardly-projecting stud, a, a strong outwardly-projecting spur, C, near the outer end of the shank, a rabbet at D, at the inner end of the shank, and a curved and expanded plate, E. This plate E carries the teeth F F', whereby the implement is adapted to be used as a corn-sheller. In plan view it is substantially circular, as shown in Fig. 2; but in edge or side view it is considerably curved, as shown in Fig. 1. The teeth F F' project inwardly from the plate, and are arranged much more advantageously than are the teeth on corn-shellers now in use. The outer teeth, F, are arranged in a circle, near the periphery of the plate E, and the inner ones, F', on the central line of said plate. This arrangement of the teeth I have found to cause a more effective engagement with the corn than when they are placed in the ordinary manner, and to result in an exceedingly rapid shelling.

The two arms which constitute the implement are pivoted together by means of the inwardly-projecting ears B, through which passes the pivot a'.

G represents a coiled spring, which is placed between the arms A A, and is held in proper place by means of the studs a a. The spring tends to keep the arms A A apart, and instantly throws them to their outermost position, when they are released by the operator, who is therefore enabled to quickly apply the sheller at any desired point.

When the device is being used for shelling corn, pulling weeds, &c., the shanks A' A' are firmly grasped by the hand in such manner that the thumb and index-finger shall bear against the spurs C C. When it is to be used as a wrench it is reversed in the operator's hand, and the jaws b b, formed by the rabbets D D, can then be engaged with a nut, for the purpose of turning it upon its bolt.

At the outer ends of the plates E E there are formed a pair of large pinchers, as shown at H H. Each pair consists of a plate having a clamping-face, h, and substantially parallel edges h' h'. To adapt these pinchers to the pulling of nails, the twisting of wire, &c., they are provided with transverse grooves $h^2$ $h^2$ and longitudinal grooves $h^3$, for the firmer grasping of the object to be manipulated.

What I claim is—

1. In a corn-sheller of the character described, the arms A' A', each being cast with a spur, C, to form a stop or bearing for the operator's hand, with a stud, a, to hold the end of a spiral spring, with the shelling-plate E, with the pivot-ear B, and with the teeth F F', as set forth.

2. In an implement of the character herein described, the arm A', having the pivot-ear B, the wrench-jaw b on one side of said pivot-ear, the corn sheller plate E on the other side of the pivot-ear, and the grooved pincher-plate H at the outer edge of the sheller-plate, as set forth.

In testimony whereof I affix my signature in presence of two witnesses.

HENRY FISHER.

Witnesses:
J. P. FAWCETT,
A. C. HURET.